US011206813B2

United States Patent
Jeong

(10) Patent No.: US 11,206,813 B2
(45) Date of Patent: Dec. 28, 2021

(54) NOSE WORK MAT

(71) Applicant: Seong Hun Jeong, Seoul (KR)

(72) Inventor: Seong Hun Jeong, Seoul (KR)

( * ) Notice: Subject to any disclaimer, the term of this patent is extended or adjusted under 35 U.S.C. 154(b) by 225 days.

(21) Appl. No.: 16/407,610

(22) Filed: May 9, 2019

(65) Prior Publication Data
US 2020/0337269 A1    Oct. 29, 2020

(30) Foreign Application Priority Data

Apr. 24, 2019    (KR) .......................... 10-2019-0047908

(51) Int. Cl.
*A01K 15/02*    (2006.01)
(52) U.S. Cl.
CPC .................. *A01K 15/025* (2013.01)
(58) Field of Classification Search
CPC .. A01K 1/0353; A01K 1/0157; A01K 15/025; A01K 15/02; A01K 15/026
USPC ................................................ 119/707, 28.5
See application file for complete search history.

(56) References Cited

U.S. PATENT DOCUMENTS

2009/0286026 A1* 11/2009 Lux-Bellus .......... A01K 1/0157
428/35.5
2012/0255504 A1* 10/2012 Kroll ................... A01K 15/021
119/719
2014/0251234 A1* 9/2014 Deutsch ............... A01K 15/021
119/721
2016/0374310 A1* 12/2016 Friscia ................. A01K 1/0353
119/28.5
2017/0196195 A1* 7/2017 Wisdom ................. A01K 29/00

FOREIGN PATENT DOCUMENTS

KR    10-2016-0093577 A1    3/2018

* cited by examiner

*Primary Examiner* — Peter M Poon
*Assistant Examiner* — Jeffrey R Larsen
(74) *Attorney, Agent, or Firm* — Patent Office of Dr. Chung Park

(57) ABSTRACT

Provided is a nose work mat. The nose walk mat includes a mat main body having a certain area, a plurality of play members coupled to an upper surface of the mat main body and hiding a feed of a dog or inducing physical activity of a dog, a sound generating part disposed under the plurality of play members and generating sound when a dog touches a first location of the mat main body, a light generating part disposed under the plurality of play members and emitting light when a dog touches a second location of the mat main body, a smell generating part disposed under the plurality of play members and generating a smell, and a control box disposed outside the mat main body, accommodating a battery therein and supplying power to the sound generating part, the light generating part and the smell generating part.

4 Claims, 15 Drawing Sheets

131

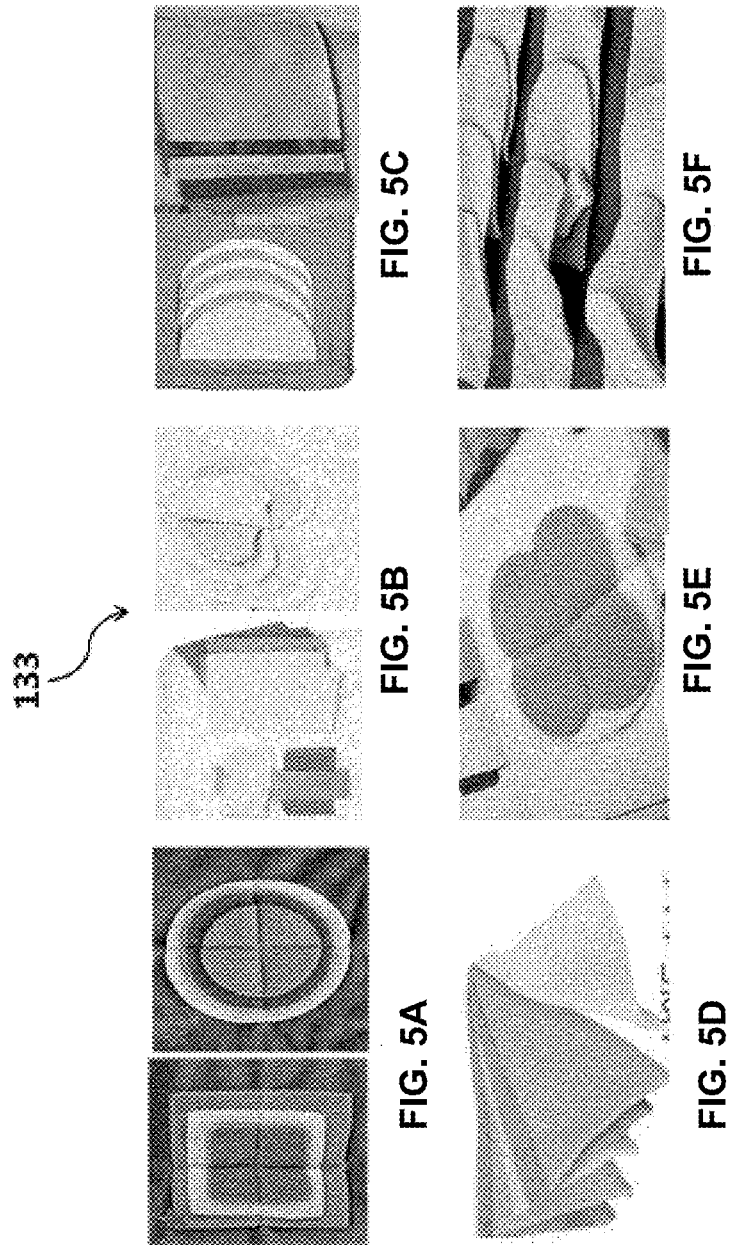

134

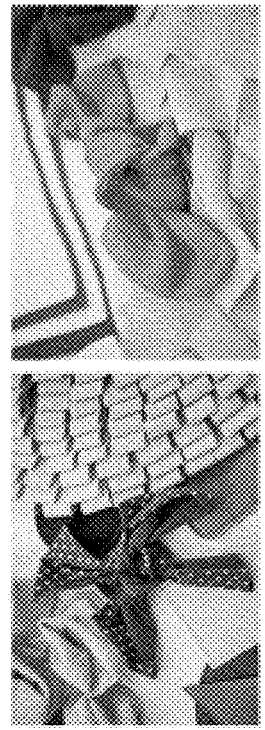
FIG. 7A
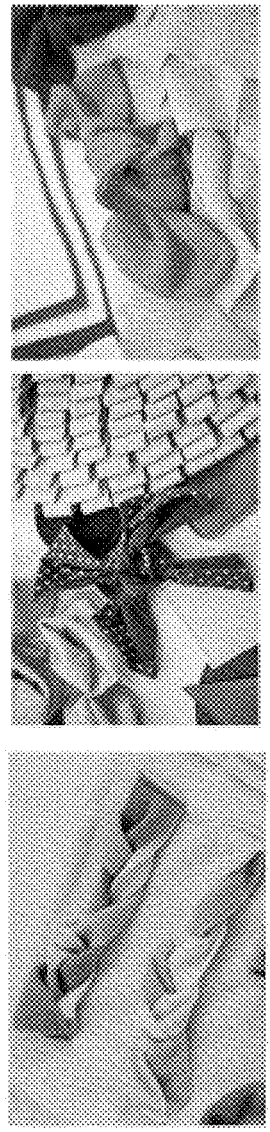
FIG. 7B
FIG. 7C
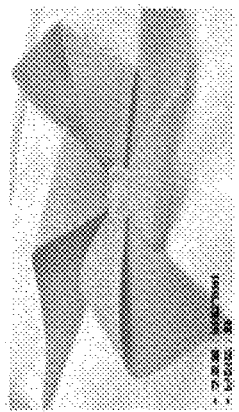
FIG. 7D
FIG. 7E

137

138

NOSE WORK MAT

CROSS-REFERENCE TO RELATED APPLICATIONS

This U.S. non-provisional patent application claims priority under 35 U.S.C. § 119 of Korean Patent Application No. 10-2019-0047908, filed on Apr. 24, 2019, the entire contents of which are hereby incorporated by reference.

BACKGROUND OF THE INVENTION

The present invention disclosed herein relates to a nose work mat, and more particularly, to a nose work mat which can induce active nose work activity and relieve stress of a dog while allowing a dog to actively seek a feed in a mat.

Typically, a human relies on the visual sense by about 70% of his/her sense, while puppies (including pet animals such as dogs and cats, hereinafter referred to as a dog) rely on the olfactory sense by more than 50% of their sense. Accordingly, the olfactory sense is important for dogs as much as the human eye.

The size of a dog's brain is about one tenth of that of a human brain, but the part of the brain that controls the smell, that is, the olfactory bulb of a dog is about 40 times larger than that of a human. Since a large part of the small brain of a dog is used to scent a smell, the olfactory sense is a very important sensory organ for a dog.

The nose work of a dog is all olfactory activities in which the nose of a dog is used, and is an olfactory training including finding snacks on the floor to eat and saving lives or finding specific objects by rescue dogs or police dogs.

The nose work mat is a play toy that relieves stress and increases self-esteem by inducing a nose work for a dog living indoors or home.

Related-art nose work mats mainly use blankets, and are manufactured by sewing pieces of various shapes fluttering on a blanket. Since such related-art nose work mats are simply formed of sewn cloth pieces, there is a limitation in that a dog loses interest with the use of only several times and the nose work activity cannot be properly performed.

PRIOR ART DOCUMENT

Patent Literature

Document 1. Korean Patent Application Publication No. 10-2016-0093577 "Nose Play Blanket"

SUMMARY OF THE INVENTION

The present invention provides a nose work mat which can induce nose work activities more actively using sound, light, and smell as well as sewn cloth pieces.

Embodiments of the present invention provide nose walk mats including a mat main body having a certain area, a plurality of play members coupled to an upper surface of the mat main body and hiding a feed of a dog or inducing physical activity of a dog, a sound generating part disposed under the plurality of play members and generating sound when a dog touches a first location of the mat main body, a light generating part disposed under the plurality of play members and emitting light when a dog touches a second location of the mat main body, a smell generating part disposed under the plurality of play members and generating a smell, and a control box disposed outside the mat main body, accommodating a battery therein and supplying power to the sound generating part, the light generating part and the smell generating part.

In some embodiments, the play member may include a combination of at least two of a tug bone, a forest, a decalcomanie, a cut, a sandwich, a wave, a knot, a forage bowl, a cross, a tunnel, a pouch, and a toy.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIGS. 3 to 12 are views illustrating various play members that can be coupled to a nose work mat according to an embodiment of the present invention;

DETAILED DESCRIPTION OF PREFERRED EMBODIMENTS

Figure 1:
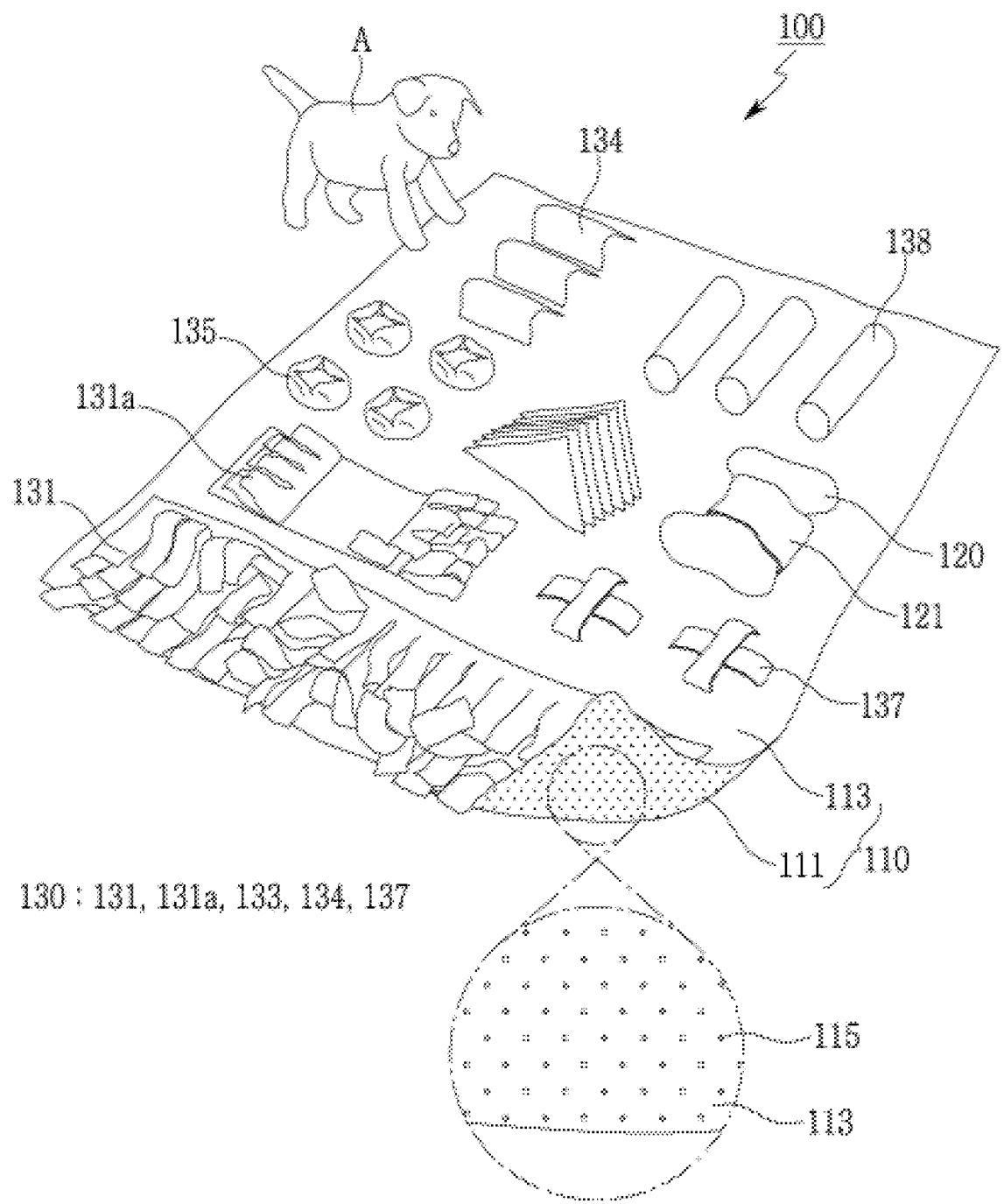
FIG. 1 is a perspective view illustrating an external configuration of a nose work mat according to an embodiment of the present invention.

Hereinafter, exemplary embodiments of the present invention will be described in detail with reference to the accompanying drawings, and like reference numerals refer to like elements.

It should be understood that when an element is referred to as "including/comprising" another element in the detail description of the invention or in the claims, it is interpreted as being not limited to only that element but further including/comprising other elements unless otherwise described.

Hereinafter, an exemplary embodiment of a nose work mat of the present invention will be described. A nose work mat 100 is illustrated in FIG. 1.

The nose work mat 100 is a play toy that can relieve stress and increase self-esteem through olfactory activities for dogs living indoors or home. The nose work mat 100 enables wariness reduction and socialization training by allowing a dog to find hidden snacks in an unfamiliar place.

The nose work mat 100 includes a mat main body 110 having a certain area, various play members 130 disposed on the mat main body 110 so as to hide a feed or snack for a dog, a sound generating part 140 for generating sound which is capable of arousing dog's interest, a light generating part 150 for generating light, a smell generating part 160 for generating a smell, and a control box 170 for driving the sound generating part 140, the light generating part 150 and the smell generating part 160.

The nose work mat 100 stimulates the curiosity of a dog through the combination of various play members 130 and the regular or irregular generation of sound, light, and smell in accordance with the behavior of a dog, and causes more active physical activity and nose work.

Figure 2:
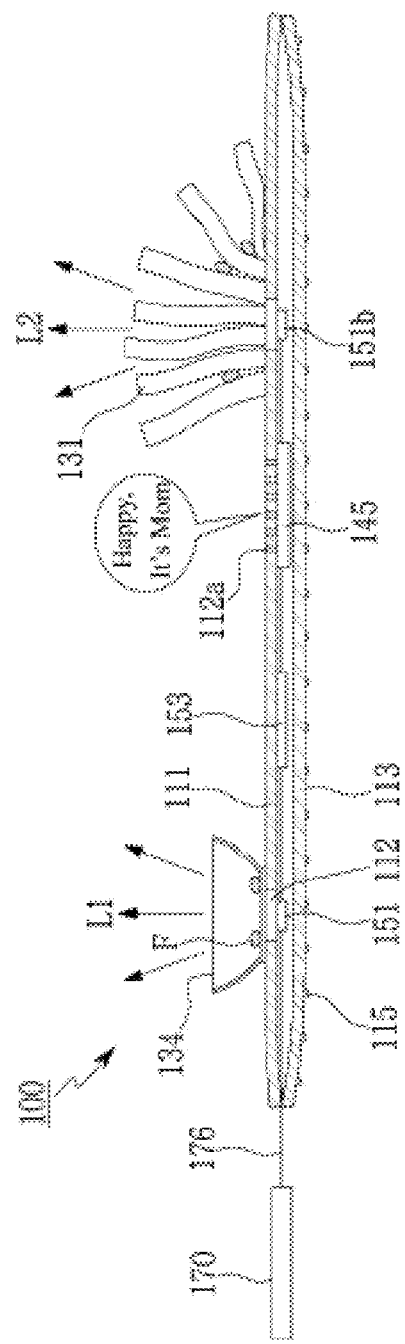
FIG. 2 is a view illustrating a cross-sectional configuration of a nose work mat according to an embodiment of the present invention.
Figure 3A:
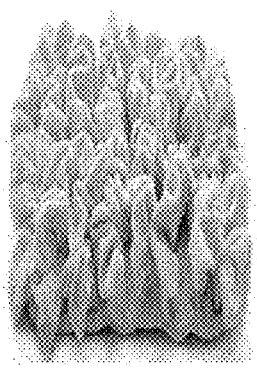
Figure 3B:
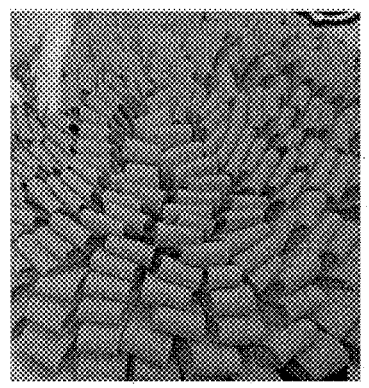
Figure 3C:
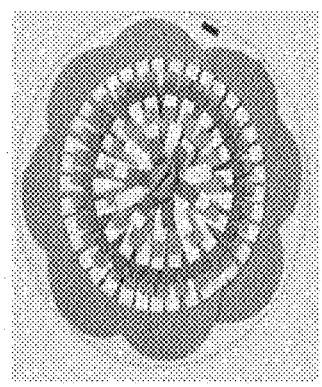
Figure 3D:
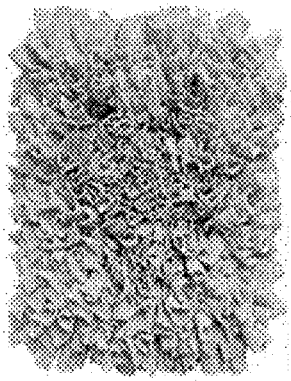
Figure 3E:
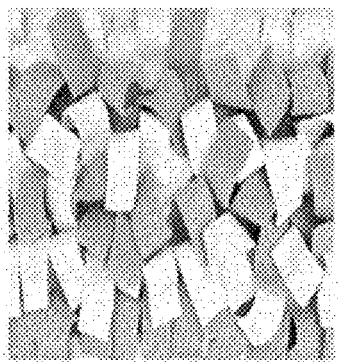
Figure 3F:
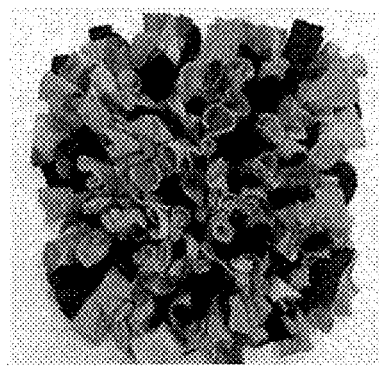
Figure 4A:
Figure 4B:
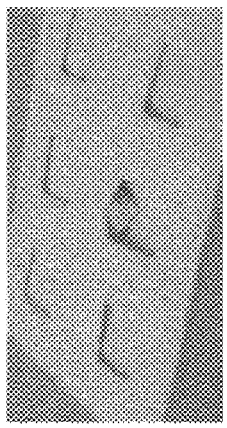
Figure 4C:
Figure 4D:
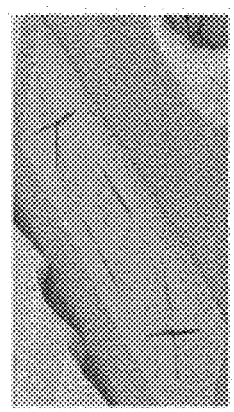
Figure 4E:
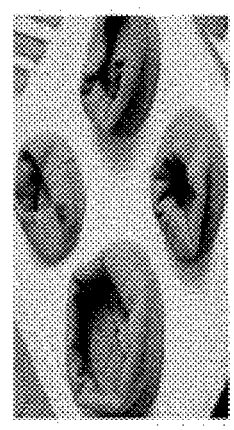
Figure 4F:
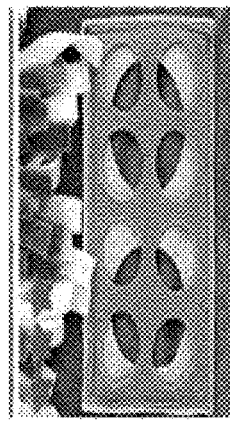

FIG. 2 is a view illustrating a cross-sectional configuration of a nose work mat 100 according to an embodiment of the present invention. The mat main body 110 is formed in a mat shape having a certain area. The mat main body 110 is formed of a soft fabric such that a dog can bite and rip the mat main body 110. The mat main body 110 has a dual structure including an upper mat 111 and a lower mat 113 as shown in FIG. 2. The upper mat 111 and the lower mat 113 are combined with each other only at the edge area and the inner area of the mat main body 110 is empty.

A sound generating part 140 and a light generating part 150 are disposed in a space between the upper mat 111 and the lower mat 113, and a wire 176 for electrically connecting the sound generating part 140 and the light generating part 150 to a control box 170 is received in the space between the upper mat 111 and the lower mat 113.

In this case, a transparent member 112 may be coupled to the surface of the upper mat 111 or a through hole 112a may be formed in the surface of the upper mat 111 in accordance with the configuration of the sound generating part 140 and the light generating part 150.

The transparent member 112 is disposed at a location corresponding to the light emitting members 151, 151a and 151b of the light generating part 150. As shown in FIG. 2, the transparent member 112 is formed in a region where the light emitting members 151, 151a and 151b of the light generating part 150 are disposed between the upper mat 111 and the lower mat 113. Lights L1 and L2 generated from the light emitting members 151, 151a and 151b are irradiated toward the upper portion of the upper mat 111.

The upper mat 111 is typically formed of a fabric material. Accordingly, when the light emitting members 151, 151a and 151b are disposed under the upper mat 111, it is difficult that the light generated from the light emitting members 151, 151a and 151b is irradiated to the outside through the upper mat 111. Thus, portions of the upper mat 111 corresponding to the light emitting members 151, 151a and 151b are cut, and the transparent member 112 is coupled to the corresponding portions.

The transparent member 112 may be formed of a durable material so as not to be damaged even when being bitten by a dog or scratched by a claw.

The through hole 112a is provided at a location corresponding to a speaker 145 of the sound generating part 140. The through hole 112a is formed through the surface of the upper mat 111 such that the sound outputted from the speaker 145 can be easily heard toward the upper portion of the upper mat 111.

The lower mat 113 is coupled to the upper mat 111 and protects the sound generating part 140 and the light generating part 150 housed therein. As shown in FIGS. 1 and 2, a plurality of anti-slip protrusions 115 are provided on the undersurface of the lower mat 113. The anti-slip protrusion 115 serves to fix the location of the mat main body 110 on the floor surface such that the mat main body 110 does not slip or move with respect to the floor when a dog runs or finds food on the top surface of the upper mat 111.

On the top surface of the upper mat 111, a tug bone 120 and a plurality of play members 130 are provided to allow a dog to feel curiosity. The tug bone 120 and the plurality of play members 130 may be sewn and fixedly coupled to the upper mat 111, or may be detachably coupled using a male and female Velcro member.

The play member 130 may be detachably coupled to the upper mat 111 such that the play member 130 can be washed when contaminated by biting of a dog.

The tug bone 120 is formed in the shape of a bone which a dog likes, and a filling material such as cotton is accommodated in the tug bone 120. The tug bone 120 assists the teeth grinding of a dog. The tug bone 120 is provided such that a dog can bites and swings the tug bone 120, and helps a dog lose the milk teeth.

The tug bone 120 may be provided in plurality while having different sizes and different colors.

The play member 130 includes a forest 131, a decalcomanie 131a, a cut 132, a sandwich 133, a wave 134, a knot 135, a forage bowl 136, a cross 137, 138, a pouch 139, a toy 139a, and a combination thereof.

FIGS. 3 to 12 illustrate various examples of the play members 130.

Forest 131 is a shape of lawn, grass and dense bush. FIGS. 3A to 3F illustrate various forms of the forest 131. The forest 131 is formed by cutting cloth into a certain length or by bending cloth. The forest 131 arouses the dog's instinct of rolling on the grass to hide the smell. For this, the forest 131 may be formed to occupy a large area on one side of the upper mat 111 as shown in FIG. 1.

Forest 131 may be used to hide snacks and feeds therebetween and allow dogs to undergo olfactory training and increase concentration.

As shown in FIG. 1, the decalcomanie 131a has a structure in which both sides thereof are rounded and attached to store snacks in the middle thereof and are cut to hide many snacks in a small space.

The decalcomanie 131a is symmetrically formed. Accordingly, snacks stored between the cut cloth pieces are not easily removed, and two dogs may use the decalcomanie 131a at the same time from both sides.

FIG. 4A to 4F illustrate various examples of the cut 132. The cut 132 are formed by making cuts in a cloth or cutting a cloth in various shapes. The cut 132 is a form that can hide snacks or food between cuts or cut grooves.

FIG. 5A to 5F illustrate various examples of the sandwich 133. The sandwich 133 is formed into a structure in which a plurality of fabrics are stacked and turned over from side to side like a book, or snacks can be put between the stacked fabrics.

The sandwich 133 may be formed by stacking various shapes such as a square, a circle, a semicircle and a triangle.

Figure 6C:
Figure 6B:
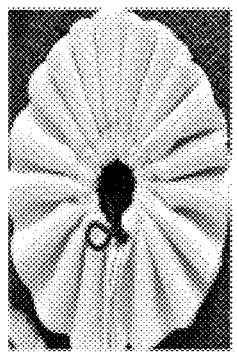
Figure 6A:
Figure 8A:
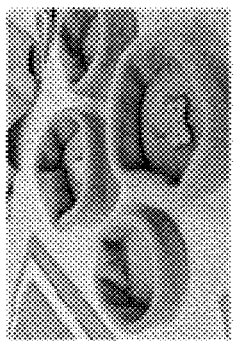
Figure 8B:
Figure 8C:
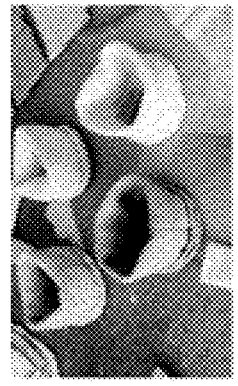
Figure 8D:
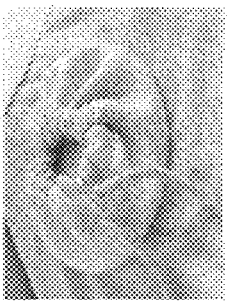
Figure 8E:
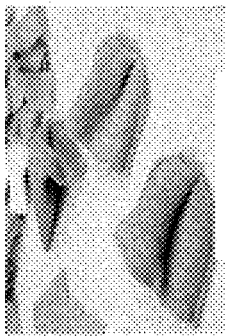

FIG. 6A to 6C illustrate various examples of the wave 134. The wave 134 is meanderingly formed by folding a fabric piece into a wavy shape. The wave 134 is a form that can hide snacks between the wavy inner gaps. The wave 134 may be formed in a linear shape, or may also be formed in a specific shape such as a circle or a square as shown in FIG. 6B.

FIG. 7A to 7E illustrate various examples of the knot 135. The knot 135 is formed by twisting or tying a plurality of cloth pieces. The knot 135 may be formed in a straight line shape as shown in FIG. 7A, or may be formed in a pinwheel or ribbon shape as shown in FIGS. 7B and 7E. The knot 135 can hide snacks between the tied gaps.

FIG. 8A to 8E illustrate various examples of the forage bowl 136. The forage bowl 136 is shaped like a feed bowl of a dog. It is possible to form a habit of eating snacks by oneself by providing a space inside a feed bowl for dogs that do not eat food in a regular feed bowl.

The forage bowl 136 may be formed in a circular bowl shape, a lucky bag shape, a folded pocket shape, or the like.

Figure 9C:
Figure 9B:
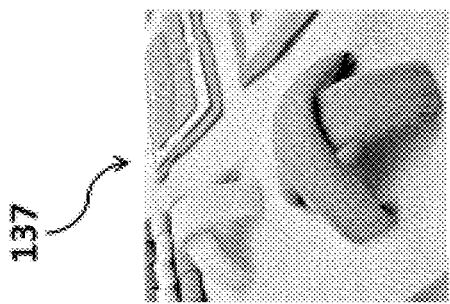
Figure 9A:
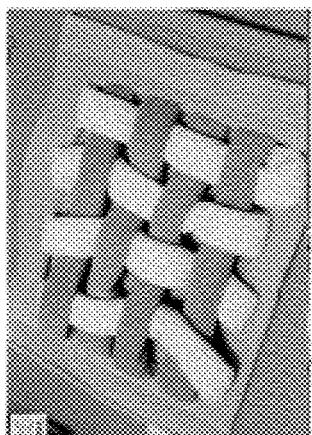

FIGS. 9A to 9C illustrate various examples of the cross 137. The cross 137 is formed in a cross shape by intercrossing a plurality of straight cloth pieces. The cross 137 may be formed in a mesh shape as shown in FIG. 9A, or may be formed in a single cross shape as shown in FIGS. 9B and 9C.

The cross 137 can hide snacks inside the intersecting center area.

Figure 10C:
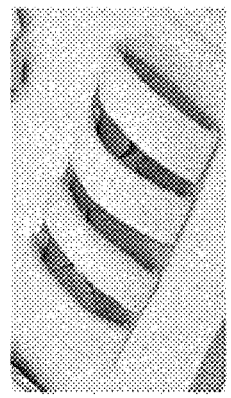
Figure 10B:
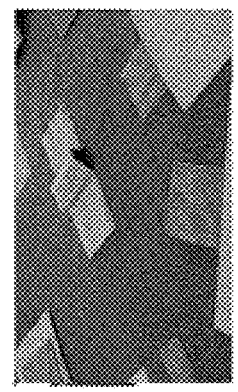
Figure 10A:
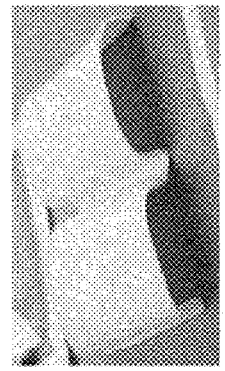

FIGS. 10A to 10C illustrate various examples of the tunnel 138. The tunnel 138 has a structure that uses the habit of a dog that digs the ground. The tunnel 138 hides snacks deep therein, and allows a dog to find snacks using the nose and feet. Only one tunnel 138 may be provided, or a plurality of tunnels 138 may also be provided consecutively as shown in FIG. 10C.

Figure 11B:
Figure 11A:
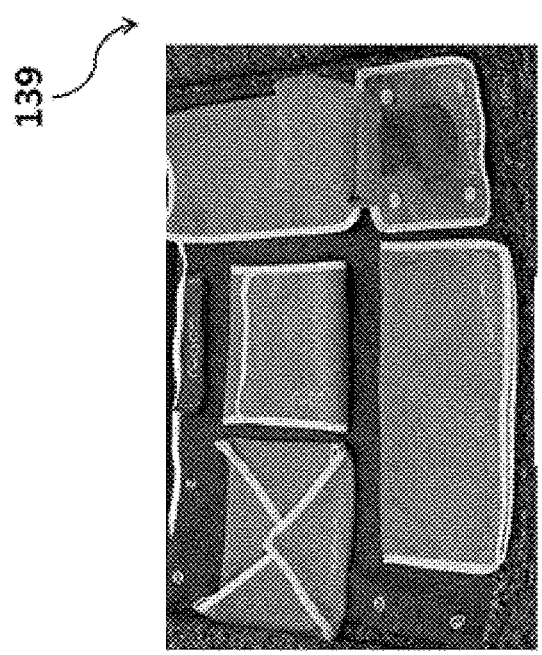
Figure 12A:
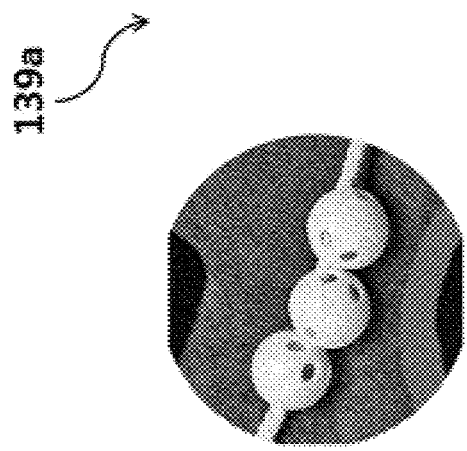
Figure 12B:
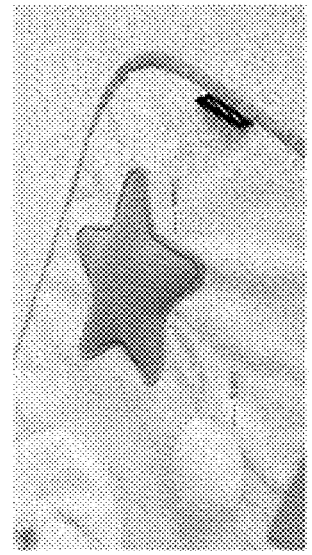
Figure 12C:
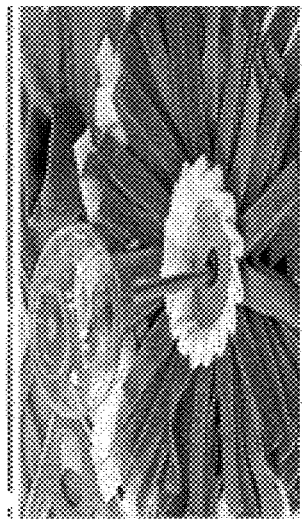
Figure 12D:

FIGS. 11A and 11B illustrate various examples of the pouch 139. The pouch 139 has a structure in which a pocket is formed by folding or stacking fabrics or a dog finds snacks by opening a flap.

FIGS. 12A to 12D illustrate various examples of the toy 139a. The toy 139a is coupled to the upper mat 111 such that a dog can play without losing interest even after finding all snacks hidden in the play member 130.

The toy 139a may include a ball, a beep, a rattle, a cotton doll and the like which a dog likes.

Figure 14:
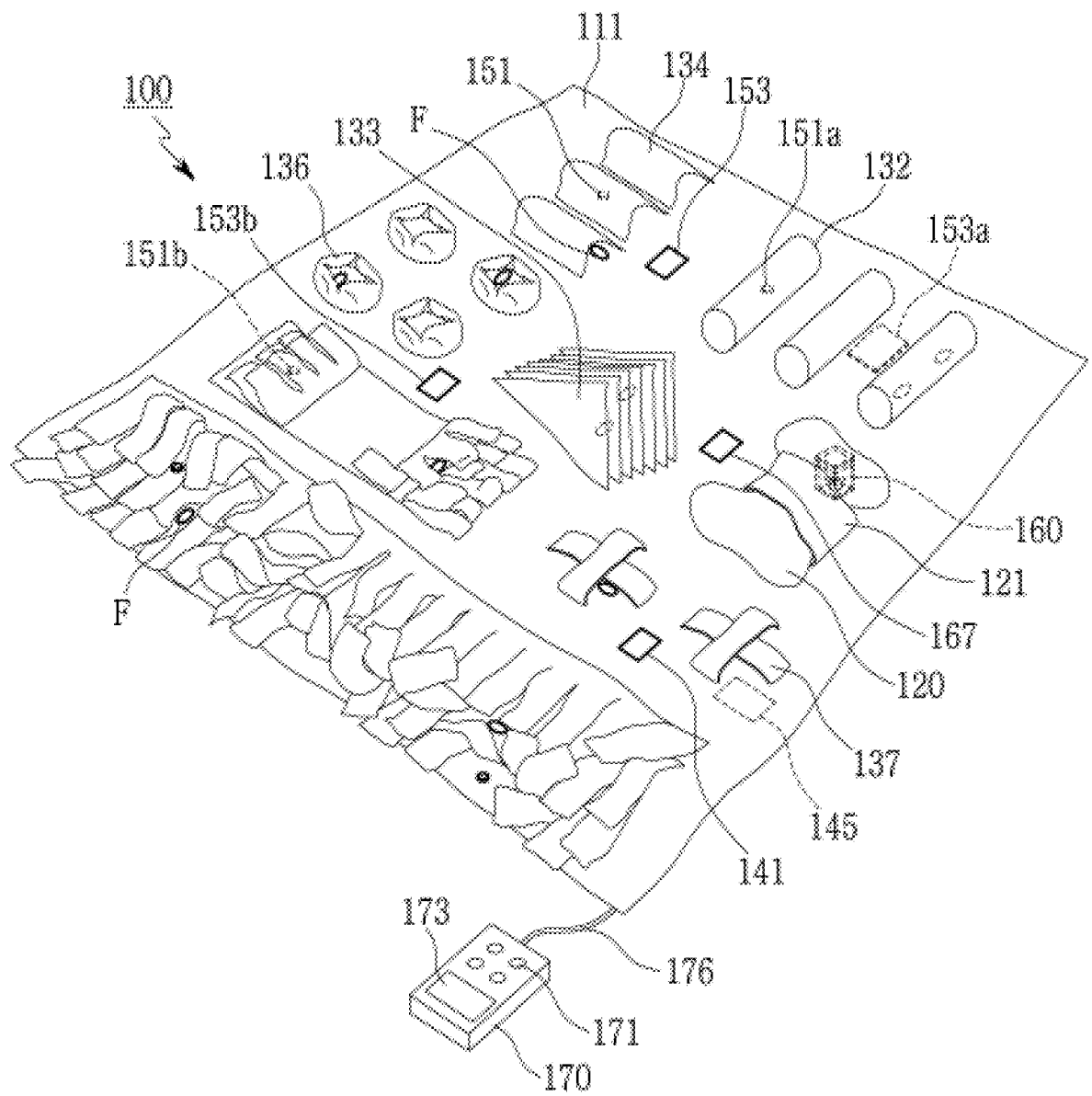
FIG. 14 is a view illustrating a state in which a feed is hidden in a nose work mat according to an embodiment of the present invention.

As shown in FIG. 1, the various types of play members 130 described above are disposed at different locations on the upper mat 111. As shown in FIG. 14, a user may hide snacks F inside each play member 130, and may allow a dog to find hidden snacks using the olfactory sense.

Figure 13:
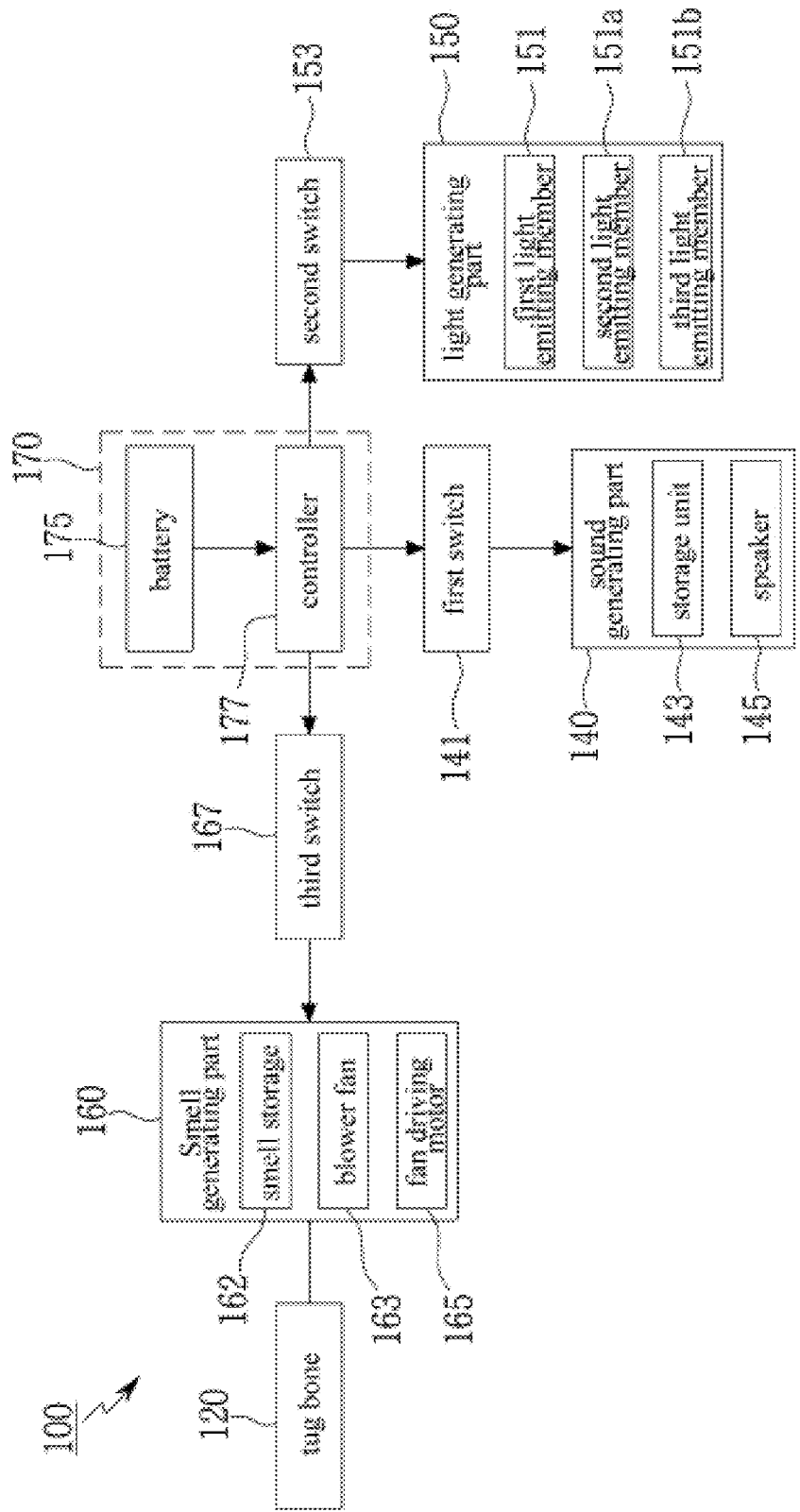
FIG. 13 is a view illustrating an internal configuration of a nose work mat according to an embodiment of the present invention.

As shown in FIG. 13, the nose work mat 100 includes a sound generating part 140, a light generating part 150, and a smell generating part 160.

The sound generating part 140 is coupled to the mat main body 110 to generate sounds in linkage with the movement of a dog. The sound generating part 140 includes a first switch 141 sensing the movement of a dog, a storage unit 143 for storing sounds, and a speaker 145 outputting sounds stored in the storage unit 143.

As shown in FIG. 14, the first switch 141 is disposed near the speaker 145. As shown in FIG. 2, the speaker 145 is located in a space between the upper mat 111 and the lower mat 113. In this case, the speaker 145 may be disposed under the play member 130 to arouse dog's interest.

A through hole 112a is formed in the surface of the upper mat 111 at which the speaker 145 is located to emit sound generated from the speaker 145 to the outside.

The first switch 141 is located closely to the speaker 145 and senses touch of the foot, nose and mouth of a dog. The first switch 141 may be a pressure sensor or a motion sensor. The first switch 141 transmits a signal to a controller 177 when the first switch 141 senses the approach or contact of a dog.

The storage unit 143 is accommodated in the control box 170. The storage unit 143 stores various sounds that can arouse interest of a dog in a form of a voice file. The sound stored in the storage unit 143 may be natural sounds such as a rain sound, a wind sound and a wave sound, a voice of a dog owner such as a voice calling a dog, or a sound of a dog of the same kind. The sound may also be a white noise or a music sound.

When a dog steps on or touches the first switch 141 while moving on the upper mat 111, if the dog hears the voice of the owner calling the dog, the sound of the other dogs, or the natural sounds, the dog may feel interest and may more actively use the nose work mat 100.

In this case, the voice file stored in the storage unit 143 may be freely changed by a user.

The light generating part 150 is coupled to the mat main body 110 to generate light according to the movement of a dog, thereby arousing interest of a dog and inducing more active snack finding activity.

The light generating part 150 includes a plurality of light emitting members 151, 151a and 151b and second switches 153, 153a and 153b disposed near the plurality of light emitting members 151, 151a and 151b, respectively.

The plurality of light emitting members 151, 151a and 151b may be formed of LEDs. As shown in FIG. 14, the light emitting members 151, 151a and 151b may be disposed under the plurality of play members 130 that are spaced apart from each other. The first light emitting member 151 is disposed under the wave 134, and the second light emitting member 151a is disposed under the tunnel 138. Also, the third light emitting member 151b is disposed under the decalcomanie 131a. As shown in FIG. 2, each of the light emitting members 151, 151a and 151b is received between the upper mat 111 and the lower mat 113 in the area where each play member 130 is located, and a transparent member 112 is coupled to the surfaces of the upper mat 111 at which the light emitting members 151, 151a and 151b are located.

The second switches 153, 153a and 153b are disposed at one side of the first light emitting member 151, the second light emitting member 151a and the third light emitting member 151b, respectively. When a dog presses or touches the second switches 153, 153a and 153b while playing on the mat main body 110, the light emitting members 151, 151a and 151b connected to the corresponding second switches 153, 153a and 153b emit light.

That is, when a dog presses the second switch 153a adjacent to the second light emitting member 151a, the second light emitting member 151a emits light. When the light is suddenly emitted from the tunnel 138, a dog suddenly feels curiosity and moves to the tunnel 138, and can find a snack hidden inside the tunnel 138.

Here, the plurality of light emitting members 151, 151a and 151b may independently emit light by detecting a dog through the respective second switches 153, 153a and 153b, and may sequentially emit light at a certain time interval when any one of the second switches 153, 153a, 153b senses a dog.

For example, when a dog steps on the second switch 153 connected to the first light emitting member 151, the first light emitting member 151, the second light emitting member 151a and the third light emitting member 151b may sequentially emit light at an interval of three minutes. In this case, a dog may move around the mat main body 110 according to the sequentially emitted light, and may find hidden snacks F inside each play member 130.

That is, a dog can find and eat the hidden snack F by looking at the light and searching the decalcomanie 131a for the snack F.

The light emitting members 151, 151a and 151b are electrically connected to the battery 175, and are supplied with power from the battery 175 and emit light according to the sensing of the second switches 153, 153a and 153b.

The smell generating part 160 is coupled to the mat main body 110, the tug bone 120, or the play member 130 to generate a smell to arouse interest of a dog.

The smell generating part 160 includes a casing 161, a smell storage 162 housed in the casing 161, a blower fan 163 disposed at one side of the smell storage 162 to blow air toward the smell storage 162, a fan driving motor 165 for driving the blower fan 163, and a third switch 167 sensing the approach of the dog to the smell generating part 160.

Figure 15:
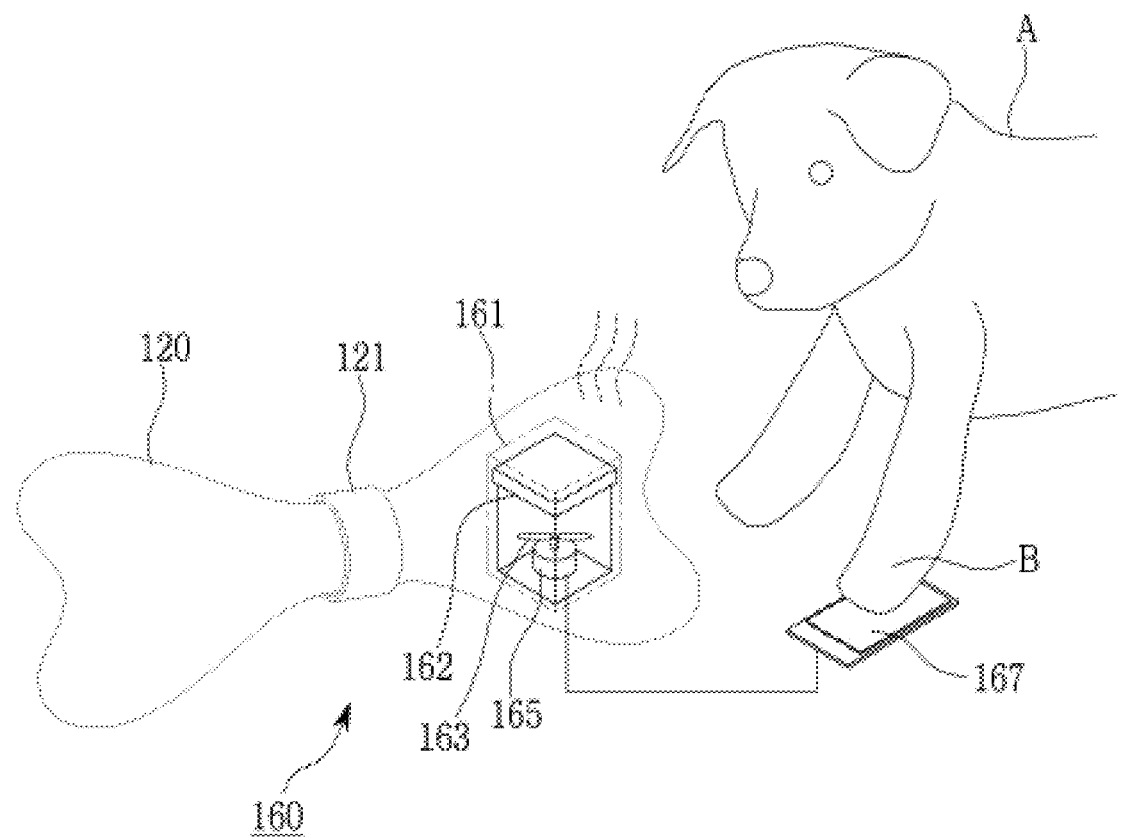
FIG. 15 is a view illustrating a configuration of a smell generating part of a nose work mat according to an embodiment of the present invention.

FIG. 15 is a view illustrating the smell generating part 160 accommodated in the tug bone 120. The casing 161 protects the blower fan 163, the fan driving motor 165 and the smell storage 162 housed therein when a dog bites the tug bone 120.

Although not shown in the drawing, a smell discharge hole is formed in the surface of the casing 161 to emit the smell to the outside.

The smell storage 162 includes a smell in which a dog may be interested. For example, the smell storage may include a feed odor, a meat odor, a bread odor, and the like.

The third switch 167 is provided as a pressure sensor or a motion sensor to sense contact or movement of a dog. When the third switch 167 detects movement of a dog, the fan driving motor 165 is driven to rotate the blower fan 163.

The smell of the smell storage 162 is emitted by the rotation of the blower fan 163, and is discharged out of the tug bone 120. A dog smells the odor emitted from the tug bone 120, and approaches the tug bone 120 to actively perform the nose work of smelling the tug bone 120 with the nose.

Here, the smell generating part 160 may be disposed to be detachable from the play member 130 such as the tug bone 120 such that the smell storage 162 can be replaced.

As shown in FIG. 14, the control box 170 is spaced apart from the mat main body 110 and is connected to the mat main body 110 by a wire 176. The control box 170 is provided with a plurality of input buttons 171 that receive the use of the sound generating part 140, the light generating part 150 and the smell generating part 160 from a user.

The control box 170 includes a storage unit 143, a battery casing 161, and a controller 177 disposed therein. A battery 175 is detachably coupled to the battery casing 161. As shown in FIG. 2, the control box 170 is connected to the speaker 145, the light emitting members 151, 151a and 151b and the fan driving motor 165, and the plurality of switches 141, 153, 153a, 153b and 167 through the wire 176.

The controller 177 is provided in a form of a board such that power is supplied to the corresponding speaker 145, the light emitting members 151, 151a and 151b, the fan driving motor 165 when a sensing signal is applied from each of the switches 141, 153, 153a, 153b and 167.

The use process of the nose work mat 100 according to an embodiment of the present invention having such a configuration will be described with reference to FIGS. 1 to 15.

A user hides a snack F in the plurality of play members 130 as shown in FIG. 14. The snack F may be hidden in various places to cause more activity of a dog A.

After hiding the snack F, a user operates the input button 171 of the control box 170 to drive the sound generating part 140, the light generating part 150, and the smell generating part 160.

In this state, when a dog is brought to the nose work mat 100 as shown in FIG. 1, the dog moves over the upper mat 111 and performs a snack search activity.

Since the snack F is hidden in each play member 130, the dog digs or smells the play member 130 to find the snack F and performs the nose work.

In this case, when the dog pushes the first switch 141, the owner voice such as "Happy! Mom is here!" is outputted through the speaker 145 as shown in FIG. 2. The dog who listens to the owner's voice is surprised and searches the play member 130 disposed at the location where the owner's voice is heard.

In addition, when the second switch 153, 153a, 153b are pressed during movement of a dog, the light L1 is generated from the first light emitting members 151, 151a, 151b disposed under the wave 134, and the dog can eat the snack F stored inside the wave 134.

Similarly, when the light L2 is generated from the second light emitting member 151a, a dog sees the light L2 and searches the forest 131 for the snack F to eat.

In this case, when the lights emitted from the first light emitting member 151, the second light emitting member 151a, and the third light emitting member 151b have different colors, the interest of a dog may be further increased.

On the other hand, as shown in FIG. 15, when a dog steps on or touches the third switch 167 during movement, the fan driving motor 165 is driven, and the blower fan 163 is rotated, thereby discharging the smell of the smell storage 162 out of the tug bone 120. Thus, the dog may smell and bite or search the tug bone 120.

Here, the nose work mat according to an exemplary embodiment of the present invention is designed such that the sound generating part 140, the light generating part 150, and the smell generating part 160 are independently controlled by the respective switches 141, 153, 153a, 153b, and 167, but may cause dog's interest and enable various trainings by sequentially generating sound, light and smell with time difference.

That is, when one of the switches 141, 153, 153a, 153b and 167 is pressed, one of the sound generating part 140, the light generating part 150 and the smell generating part 160 which corresponds to the pressed switch is first driven, and another generating part which is different from the driven one in kind and most adjacent to the driven one may be driven at a certain time interval.

For example, when the third switch 167 is stepped or touched, the fan driving motor 165 is driven to drive the smell generating part 160. In this case, even if a dog does not step on any other switch additionally, the closest one to the corresponding smell generating part 160 among the sound generating part 140 or the light generating part 150 may be dynamically determined and driven after a lapse of a certain time. In addition, the sound generating part 140 or the light generating part 150 which is another type not driven yet and is closest in distance may be dynamically selected and driven after a lapse of a certain time.

As described above, the nose work mat according to an embodiment of the present invention includes various types of play members capable of causing interest of a dog disposed on a main body of a mat, a sound generating part for generating sound, a light generating part for generating light, and a smell generating part for generating smell.

Accordingly, when a dog moves on the main mat main body, sound, light and smell are generated, thereby inducing a dog to move to the play member and inducing more active snack searching.

As a result, since more physical activities of a dog become possible, the nose work mat helps to relieve the stress of a dog and to correct the problematic behaviors.

In addition, the nose work mat helps to increase the self-esteem of a dog through activities to behave by oneself and then gain something by satisfying instinct through activities to find snacks.

Furthermore, sound, light, and smell stimulate the olfactory, visual, and auditory senses of a dog, thereby enabling various sensory training.

The technical sprit of the present invention has been described through several embodiments.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A nose walk mat comprising:
a mat main body having a certain area;
a plurality of play members coupled to an upper surface of the mat main body and hiding a feed of a dog or inducing physical activity of a dog;
a sound generating part disposed under the plurality of play members and generating sound when a dog touches a first location of the mat main body and comprising a speaker;
a light generating part disposed under the plurality of play members and emitting light when a dog touches a second location of the mat main body and comprising a plurality of light emitting members that emit light of different colors;
a smell generating part disposed under the plurality of play members and generating a smell when a dog touches a third location of the mat main body and comprising a casing that has a smell discharge hole formed in a surface of the casing and comprising a smell storage housed in the casing; and
a control box disposed outside the mat main body, accommodating a battery therein and supplying power to the sound generating part, the light generating part and the smell generating part,
wherein the plurality of play members comprises two or more different items each selected among a tug bone, a forest, a decalcomanie, a cut, a sandwich, a wave, a knot, a cross, a tunnel, a pouch, a toy, and a forage bowl and wherein the two or more different items are spaced apart from each other on the mat main body,
wherein the mat main body comprises an upper mat and a lower mat coupled to a lower portion of the upper mat,
wherein a through hole is formed in a surface of the upper mat and provided at a location corresponding to the speaker,
wherein a plurality of transparent members is located in a surface of the upper mat and upwardly emits light generated from the plurality of light emitting members and is provided at locations corresponding to the plurality of light emitting members,
wherein the plurality of play members is detachably coupled to the upper mat using Velcro,
wherein, when the dog touches one of the first, second and third locations of the mat main body, a corresponding one of the sound generating part, light generating part, and smell generating part is driven, and wherein, after a lapse of a certain time, another one of the sound generating part, light generating part, and smell generating part, which is closest in distance to the corresponding one, is driven, and
wherein the plurality of light emitting members is sequentially driven when the dog touches the second location of the mat main body.

2. The nose walk mat of claim 1, wherein:
the sound generating part further comprises:
a storage unit housed in the control box and storing various kinds of sounds; and
a first switch disposed at the first location to sense contact of a dog;
the speaker is disposed between the upper mat and the lower mat at a location corresponding to a lower portion of any one of the plurality of play members;
the various kinds of sounds comprise a same kind of dog sounds, a voice of an owner of the dog, natural sounds, white noise, and music; and
the speaker outputs the sound stored in the storage unit when the first switch senses contact of a dog.

3. The nose walk mat of claim 1, wherein:
the light generating part further comprises:
a plurality of second switches disposed at the second location to sense contact of a dog, and
wherein the plurality of light emitting members is disposed between the upper mat and the lower mat and located to correspond to lower portions of the plurality of play members.

4. The nose walk mat of claim 1, wherein the smell generating part is housed in any one of the plurality of play members, and comprises:
a third switch disposed at the third location to sense contact of a dog;
a blower fan rotated such that a smell of the smell storage is emitted to the outside when the third switch senses contact of a dog; and
a fan driving motor for driving the blower fan.

* * * * *